June 16, 1931. W. A. GIERMANN 1,810,600
CORN HARVESTER
Filed Aug. 21, 1929 7 Sheets-Sheet 1

WILHELM A. GIERMANN
Inventor
By C.A.Snow&Co.
Attorneys.

Patented June 16, 1931

1,810,600

UNITED STATES PATENT OFFICE

WILHELM A. GIERMANN, OF ONAWA, IOWA

CORN HARVESTER

Application filed August 21, 1929. Serial No. 387,544.

This invention relates to a machine for harvesting corn, one of the objects being to provide a harvester adapted to be drawn along rows of standing corn and, after severing the stalks, operating to convey the stalks to snapping and husking mechanisms from which the husked corn will be directed to delivering mechanism.

Another object is to provide a means for directing leaning and fallen stalks into the machine.

A still further object is to provide a novel mechanism for gathering loose ears or stalks from the ground and directing them into the machine from the rear thereof.

A further object is to provide a machine of this character that can be propelled readily, the power required for driving the various parts thereof being received from the main supporting wheels.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings the preferred form of the invention has been shown.

In said drawings.

Referring to the figures by characters of reference, 1 designates the axle of the machine to which are secured the combined supporting and driving wheels 2 which, as shown, may be formed with annular openings 3 across which are extended plates 4 adapted to bite into the surface of the ground so as to prevent the wheel from slipping.

Each of the wheels 2 is mounted for rotation on the axle 1 and has secured to it a large sprocket 5 for transmitting motion through a chain to mechanism hereinafter described.

Axle 1 has a main frame 6 mounted thereon, this frame being of any desired proportions and material suitable for holding the several parts of the mechanism. At one side the frame has a forwardly extended tongue 7 to the rear portion of which is pivotally connected the forked rear end 8 of a draft tongue 9. This draft tongue is adapted to be hitched to a tractor or other propelling means and has an operating lever 10 fulcrumed thereon. One arm of this lever is connected by a link 11 to the tongue 7 while the other arm carries a dog 12 or the like adapted to engage a toothed segment 13 mounted on the draft tongue 9. This construction has been illustrated clearly in Figures 3 and 15.

Figures 3, 15:
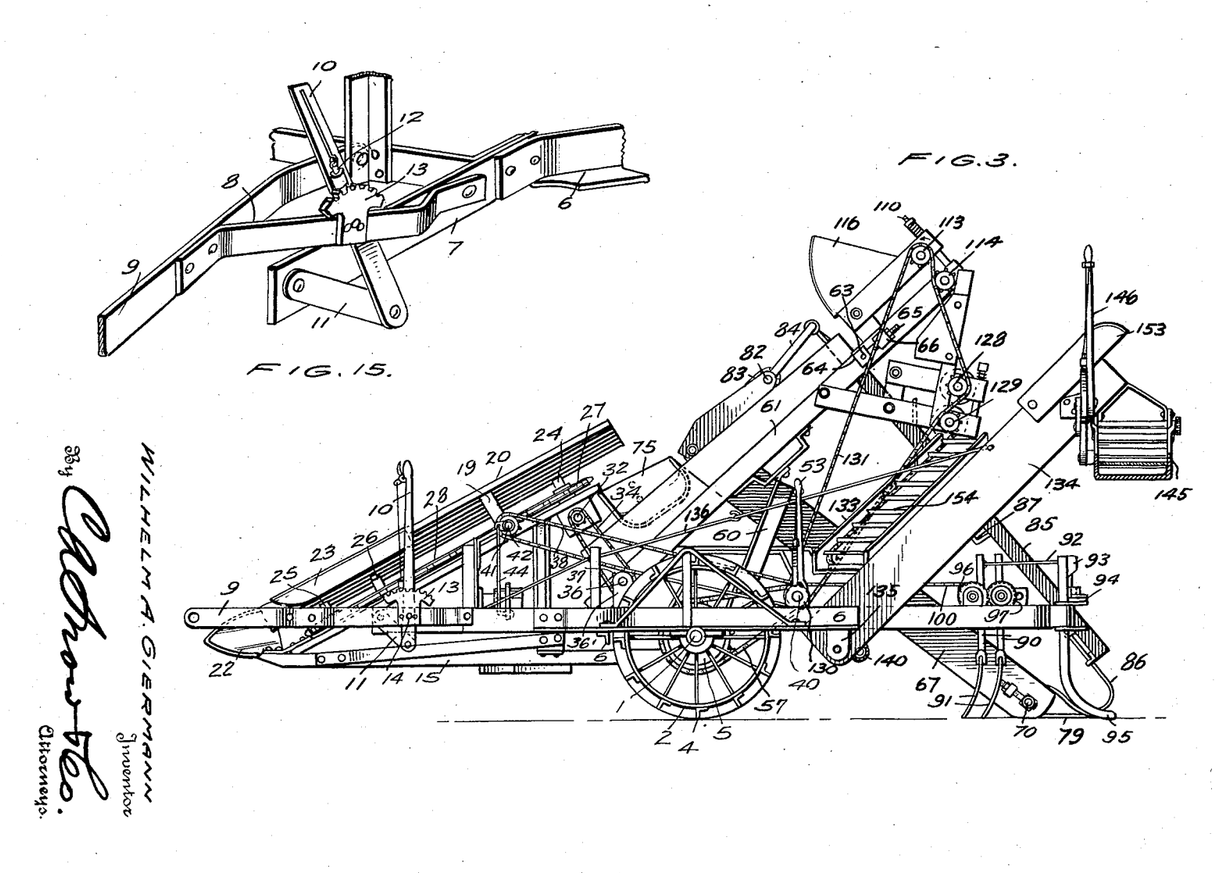
Figure 3 is an elevation of the other side thereof.
Figure 15 is a perspective view of a portion of the mechanism used for raising and lowering the front end of the harvester.

It will be noted that when lever 10 is swung rearwardly the lower arm thereof will thrust through link 11 while the fulcrum 14 of the lever will swing downwardly. This will result in the elevation of tongue 7 relative to the draft tongue 9 and consequent elevation of the forward end of the main frame 6. By reversing the movement of the lever the front end of the main frame 6 will be lowered. The parts can of course be held in any position to which they may be shifted by allowing dog 12 to engage the toothed segment 13.

Connected to the front portion of the main frame 6 adjacent that side remote from the tongue 7 are guide strips 15 the forward ends of which diverge to constitute gathering fingers 16. Suitable braces 17 can be extended from the front portion of the main frame 6 to the forward end portions of the fingers.

Laterally spaced boards 18 are mounted at their lower ends on the forward end portions of the fingers 16 and are inclined upwardly and rearwardly, the inner side edges being parallel from their upper ends to points above the rear portions of the fingers 16 and diverging downwardly from said points to the lower ends of the boards. Brackets 19 are mounted on boards 18 and serve to support flat boards 20 that are not only inclined upwardly and rearwardly but also have their inner edges shaped substantially like the corresponding edges of the boards 18, the lower portions of these inner edges 21 diverging downwardly. The forward ends of boards 18 and 20 are connected by plates 22 that cover the inner edges thereof and act as shields to properly guide stocks into the spaces between the boards 20 and the boards 18.

It will be noted that the boards 20 are inclined upwardly and laterally, their inner side edges being below the level of the outer side edges. To the forward portion of the outer edges of the boards 20 are secured laterally and downwardly rounded shields 23 which act to lift inclined stalks in the paths thereof and guide them over the forward ends of the plates 22. The plates 22 will prevent the apparatus from slipping stalks adjacent to the gathering mechanism. The plates 22 which form the noses of the gathering boards 18 and 20 can be raised or lowered so as to be supported at any desired distance from the ground, this adjustment being effected by manipulating lever 10 as heretofore explained.

Journaled in the boards 18 are upper shafts 24 and lower shafts 25 and between these shafts at the angles formed by the inner edges of the boards 18 are idler wheels 26. On shafts 24 and 25 are mounted sprockets 27 and the sprockets on each board 18 engage an endless chain 28 having laterally extending gathering fingers 29. The chains above the two boards 18 are so positioned that the fingers on each chain will travel directly opposite to the fingers on the opposed chain, these chains moving upwardly so that the fingers, bridging the space between the boards 18, will support the stalks in upstanding position as the machine moves forwardly.

The rearward travel of the fingers 29 within the space between boards 18 will be at substantially the same speed as the forward travel of the machine.

Each of the upper shafts 24 has a gear 30 secured to the lower end thereof and meshing with another gear 31 secured to a transverse shaft 32. One of these shafts is provided for each shaft 24 and while the shafts 32 are in alinement, they are also spaced apart so as to allow stalks to pass freely between them.

A sprocket 33 is secured to the outer end portion of each shaft 32 and is adapted to receive motion through a chain 34 from another sprocket 35 secured to a countershaft 36. This countershaft, which is journaled in suitable standards 36' provided therefor on the main frame 6, has a sprocket 37 located beneath and adapted to be driven by the lower flight of an endless chain 38.

Figures 6, 7, 8:
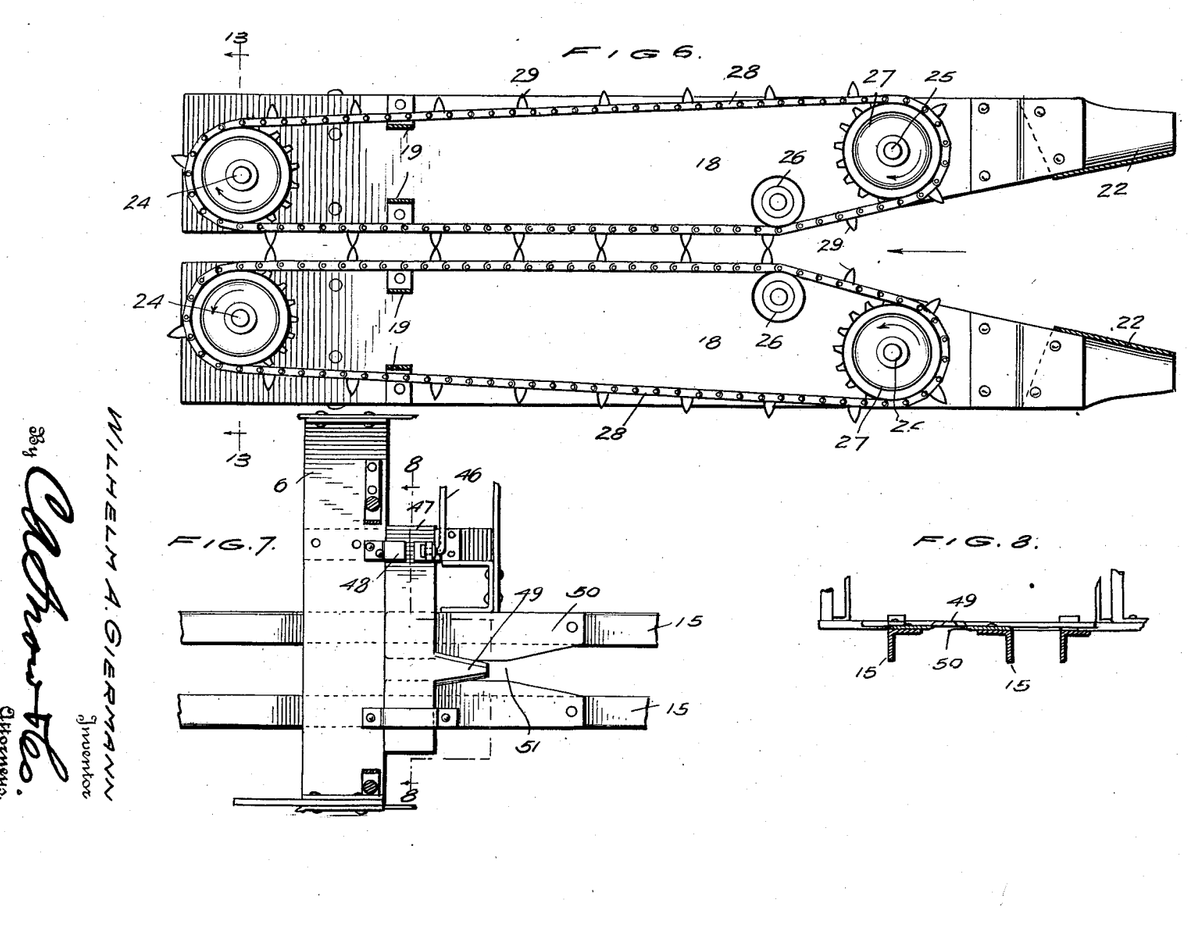
Figure 6 is an enlarged section on line 6—6, Figure 2.
Figure 7 is a plan view of the cutter bar and adjacent parts.
Figure 8 is a section on line 8—8, Figure 7.
Figure 9:
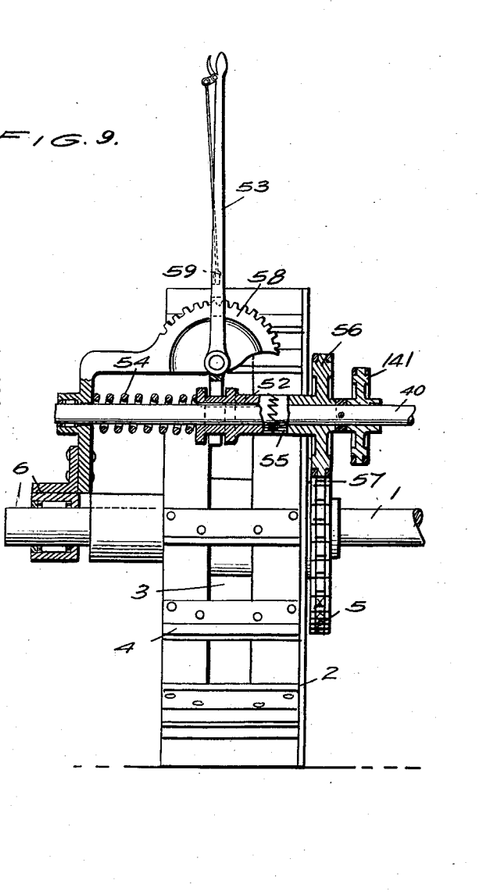
Figure 9 is a section on line 9—9, Figure 1.
Figure 10:
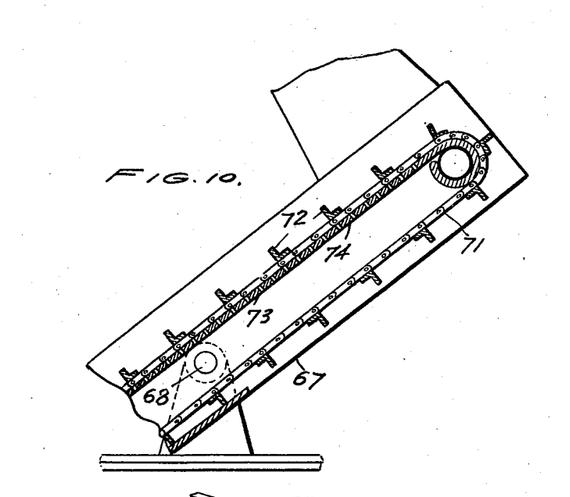
Figure 10 is an enlarged section through a portion of the machine taken on line 10—10, Figure 1.
Figure 16:
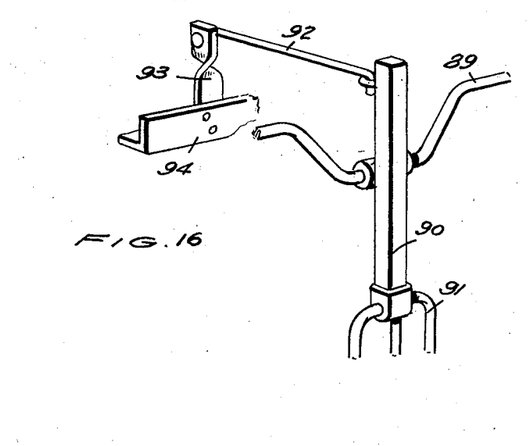
Figure 16 is a perspective view of a portion of the mechanism employed for gathering material from the ground at the rear of the machine.

The chain 38 constitutes a means for transmitting motion from a sprocket 39 on a main countershaft 40 to a sprocket 41 secured to a crank shaft 42 supported above the main frame adjacent one side of the gathering mechanism. The crank arm 43 of this shaft is connected by a pitman 44 to a bell crank 45 one arm of which is connected by a pitman 46 to a cutter bar 47. This cutter bar is mounted for reciprocation within guides 48 suitably located adjacent the front of the frame 6. The cutter bar has a blade 49 extending forwardly therefrom, the side edges of this blade converging forwardly and being sharpened. Stationary blades 50 are secured to the guide strips 15 and extend under the cutter bar, and the parts are so positioned that, when the cutter bar 47 is reciprocated by the mechanism provided therefor, the blade 49 will reciprocate across the space 51 between the stationary blades 50, thereby severing any standing stalks that may have been guided into said space 51. In this connection attention is directed to the disclosure in Figure 7. The operating mechanism for the cutter bar has been illustrated in detail in Figure 14.

The main countershaft 40 is journaled on the main frame 6 and extends back of the wheels 2. Secured to this main countershaft near each end thereof is a clutch member 52 mounted to slide on but rotate with the shaft. A lever 53 may be used for shifting the clutch member in one direction against the action of a spring 54. This spring serves to hold the clutch member normally in engagement with the hub 55 of sprocket 56 that is rotatably mounted on shaft 40. Said sprocket is adapted to receive motion through a chain 57 from the adjacent sprocket 5.

A toothed segment 58 may be provided for lever 53 and a dog 59 carried by said lever may be employed for engaging the segment to hold the lever in any position to which it might be adjusted. When the lever is moved to one position the clutch member 52 will be disengaged from sprocket 56 so that forward movement of the machine will not result in actuation of the main countershaft 40. However, when lever 53 is moved in the opposite direction, the clutch member will couple sprocket 56 to the main countershaft 40 and this will cause said main countershaft to rotate when the machine is moved forwardly.

The cooperating faces of the clutch member 52 and hub 55 are provided with ratchet teeth and each clutch member 52 has a limited longitudinal movement independently of its lever 53. Thus should the main wheel 2 and its sprocket 5 be retarded, as during the turning of the machine, it will be possible for the sprocket 56 and the clutch member 52 to have a relative rotation to compensate for the difference in the speed of rotation of sprocket 56 and the main countershaft 40.

An upstanding yoke 60 is secured on the main frame adjacent one side thereof and extends under and is secured to an intermediate portion of an elevator frame 61. This frame is inclined upwardly and rearwardly and its lower portion is mounted on the transverse or countershaft 36. On shaft 36 is mounted an endless conveyor 62 the upper portion of which is mounted on a transverse shaft 63 mounted in bearings 64. These bearings are adjustable by means of threaded stems 65 projecting therefrom through blocks 66 on the sides of the elevator frame 61. Thus it is possible to shift the shaft 63 toward or from the shaft 36 to loosen or to tighten the elevator.

For the purpose of collecting fallen ears and stalks over which the machine has passed without gathering them onto the elevator, a novel mechanism has been provided upon the rear portion of the machine. This mechanism includes the frame 67 of a supplemental elevator. Said frame is pivotally mounted at a point between its ends, as shown at 68, and has a transverse shaft 69 journaled in the upper portion thereof while another transverse shaft 70 is journaled in the lower portion.

Mounted on the shafts 69 and 70 is a conveyor made up of endless chains 71 connected by transverse slats 72. This conveyor is adapted to drag material upwardly along a plate 73 the upper portion of which is perforated as indicated at 74 to form a screen through which dirt can fall and thus be separated from the other material being conveyed.

The upper end portion of the endless conveyor is adapted to deliver material into a spout 75 which, in turn, directs said material on to the elevator 62 heretofore described.

The shaft 69 has a sprocket 76 to which motion is transmitted through a chain 77 from a sprocket 78 secured to the shaft 40.

Pivotally connected to and extending rearwardly from the lower end portion of the elevator frame 67 is a plate 79 having an apron 80 extending forwardly and upwardly from the rear edge thereof so as to overhang the lower portion of the elevator 71—72.

Standards 81 are extended upwardly from the upper portion of the frame 67 and journaled therein is a shaft 82 adapted to be driven by chain and sprocket mechanism 83 from the shaft 69. Shaft 82 is provided with a crank 84 engaged by one end of a beam 85. To the lower end of this beam are connected rake tines 86. A guide loop 87 is secured to the beam 85 at a point between its ends and this loop slidably engages a yoke 88 that is pivotally connected to and extends upwardly from the sides of the frame 67.

Obviously when the shaft 82 is rotated in a clockwise direction it will pull the beam 85 upwardly and forwardly and cause the tines 86 to draw material along the ground onto the guide plate or apron 80 and thence to a point above the conveyor in frame 67. During this movement the rear portion of the guide bracket 87 will come against the pivoted yoke 88 and cause said yoke to swing upwardly and forwardly with the result that the beam will be elevated so as to lift the tines 86 out of engagement with the material being drawn thereby. During the continued rotation of the crank 84 the beam 85 will be thrust rearwardly and engage material back of the elevator so that when the tines 86 again move forwardly this material will be drawn by them onto the elevator.

A supplemental mechanism has been provided for directing loose material laterally into a roll where it can be collected by the rake tines 86. This mechanism includes an obliquely disposed crank shaft 89 located adjacent the inner side of the elevator frame 67. On each crank of this shaft is pivotally mounted a shank 90 provided at its lower end with a brush 91 composed of a plurality of downwardly extending fingers.

The shank 90 is pivoted on the crank at a point between its ends and its upper end is connected by a link 92 to a fixed member 93 on a supplemental frame 94. This supplemental frame is connected to and adapted to swing upwardly and downwardly relative to the main frame 6. The rear portion of the supplemental frame is supported by runners 95 adjustably attached thereto and adapted to slide over the surface of the ground.

Motion may be transmitted to shaft 89 through meshing gears 96 and 97, gear 97 being connected to the shaft 89 by a universal coupling 98. A sprocket 99 is secured to the shaft of gear 96 and is adapted to receive motion through a chain 100 from a sprocket 101 on the main countershaft 40. Thus rotation of shaft 40 will result in the transmission of motion to the obliquely disposed crank shaft 89 and the shanks 90 will be caused to swing with a sweeping motion whereby materials on the ground in the path of the fingers 91 will be shifted laterally into a roll from which they can be gathered by the rake tines 86.

The mechanism thus far described is designed for harvesting corn and for collecting fallen stalks and detached ears so that all of them will be properly directed into the machine and conveyed rearwardly by the elevator 62.

There is provided, in addition to the foregoing mechanism, separate means for snapping the ears and for husking them. The snapping mechanism is located above the upper end of the elevator 62 while the husking mechanism is arranged below the snapping mechanism.

The frame 61 is extended upwardly and rearwardly beyond the elevator 62 and supports a shaft 102 to which is secured a snapping roll 103. Another snapping roll 104 preferably provided with outwardly extending ear-engaging devices 105 is carried by shaft 106 supported in the sides of a frame 107 that is pivotally connected at 108 to small standards 109 projecting from the sides of the frame 61. Bolts 110 are extended upwardly from the upper end portion of frame 61 and are slidably engaged by the sides of the pivoted frame 107.

The bolts 110 carry springs 111 that can be adjusted by means of nuts 112. By means of these springs the snapping roll 104 is normally pressed yieldingly against the roll 103.

A sprocket 113 is carried by the shaft 106 while another sprocket 114 is carried by the shaft 102.

A lower deflecting plate 115 is supported by the sides of frame 61 close to and directly in front of the roll 103 while supported by the pivoted frame 107 in front of the roll 104 is a deflecting hood 116 having a shield 117 extending downwardly in front of roll 104 and toward the deflecting plate 115.

It will be apparent from the foregoing that when the severed stalks are conveyed upwardly head first toward the snapping rolls, said stalks will be guided by the plates 115 and 117 so as to pass between the rolls 103 and 104. The rolls are driven in opposite directions respectively by mechanism hereinafter described and will act to detach the ears from the stalks. The detached ears will drop between roll 103 and plate 115 on to a lower deflecting plate 118 that extends downwardly from the upper end of frame 61 to the husking mechanism.

Secured to and extending rearwardly from the sides of the frame 61 is a stationary supplemental frame 119 in which is journaled a shaft 120 carrying a husking roll 121. Standards 122 extend from the sides of frame 119 and to these standards is attached a pivoted frame 123 carrying the upper husking roll 124. Bolts 125 extend upwardly from the rear end of frame 119 and are loosely engaged by the pivoted frame 123. Springs 126 are mounted on these bolts and thrust downwardly on the frame 123 so as to cause the upper roll 124 to press yieldingly toward the roll 121.

Frame 119 is supported in part by arms or hangers 127 that extend downwardly from the deflecting plate 118.

A sprocket 128 is secured to and rotates with the shaft of the upper husking roll 124 and another sprocket 129 is secured to and rotates with the shaft 120 on which the lower husking roll is mounted. A sprocket 130 is adapted to rotate with the main countershaft 40 and serves to transmit motion through an endless chain 131 to the several sprockets 113, 114, 128, and 129. This chain extends between the sprockets 113 and 114 and also between the sprockets 128 and 129. Consequently the two snapping rolls 104 and 103 will be driven positively in opposite directions respectively while at the same time the two husking rolls 121 and 124 will also be rotated in opposite directions.

Ears delivered from the snapping rolls will be directed downwardly by the deflecting plates 115 and 118 onto a table 132. This table is inclined downwardly toward the space between the rolls 121 and 124.

Figures 5, 11:
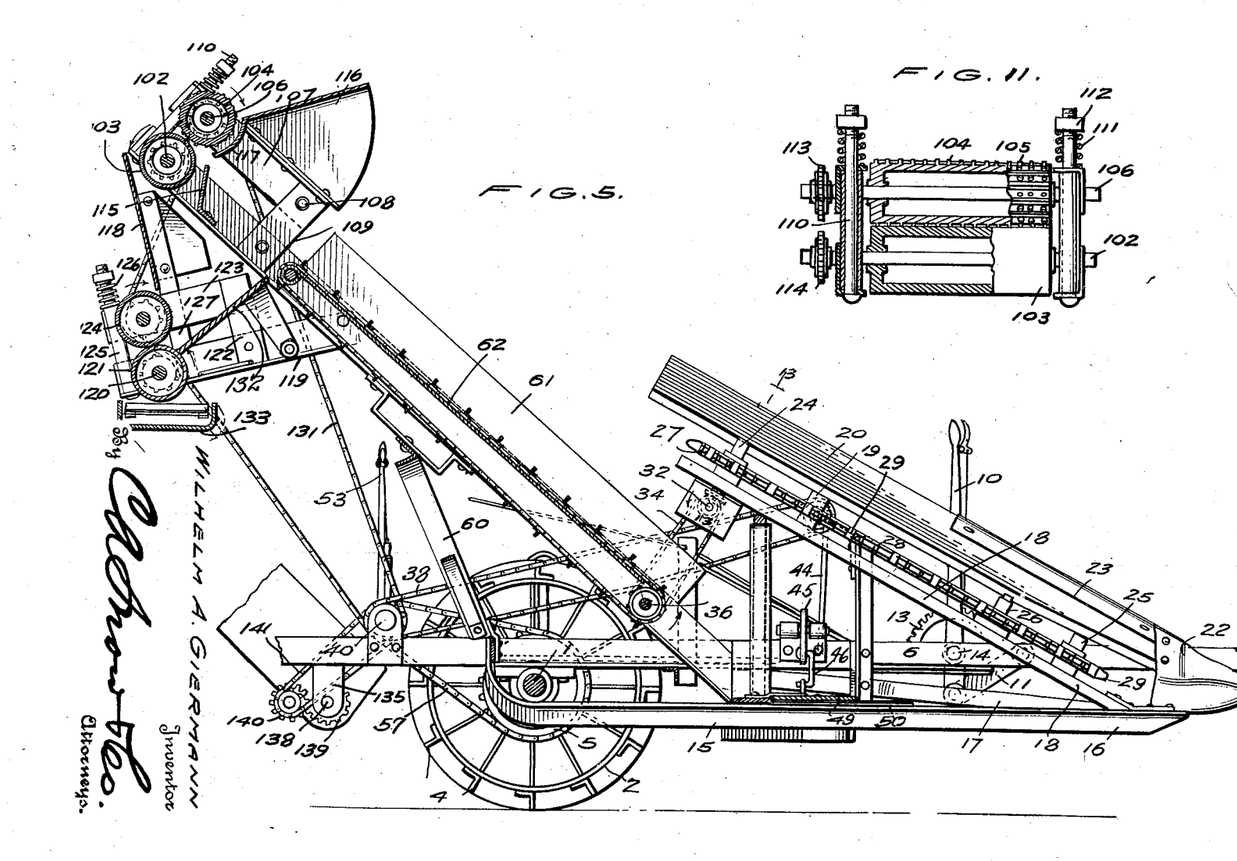
Figure 5 is a section through a portion of the machine on line 5—5, Figure 1.
Figure 11 is a view partly in section and partly in elevation of the snapping mechanism, the section being taken on the line 11—11, Figure 2.

A delivering chute 133 has its upper end supported under the husking rolls 121 and 124 and is inclined downwardly and laterally so as to deliver the husked ears into the lower portion of a delivering elevator. This may consist of a frame 134 pivotally mounted at its lower end in the rear portion of the main frame 6, as shown at 135, and adapted to be supported in an inclined position by means of guy rods 136 or any other means provided for that purpose. Frame 134 may contain an endless conveyor 137 adapted to be driven by a lower shaft 138. As shown particularly in Figure 5 this shaft has a gear 139 meshing with a gear 140. Chain and sprocket mechanism 141 is provided for transmitting motion from the main countershaft 40 to the gear 140 and thence to gear 139 and shaft 138. Thus the elevator 137 will be driven in the proper direction.

Figure 1:
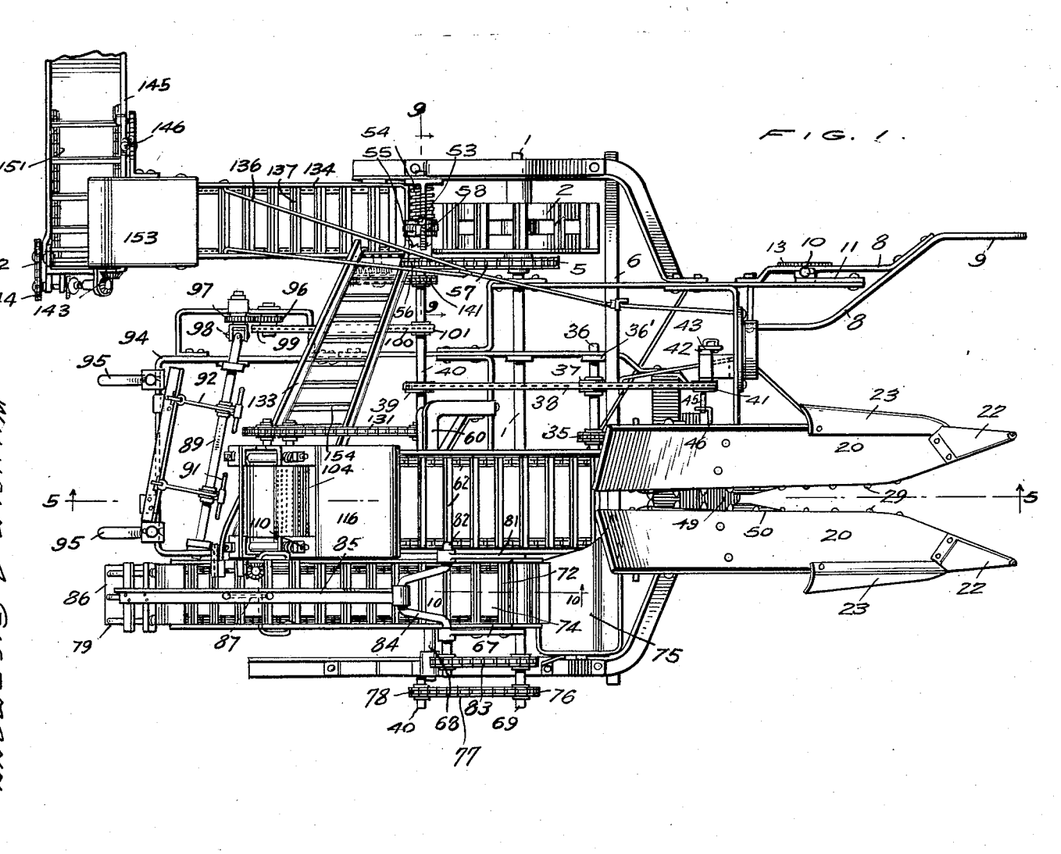
Figure 1 is top plan view of the machine.
Figures 2, 12:
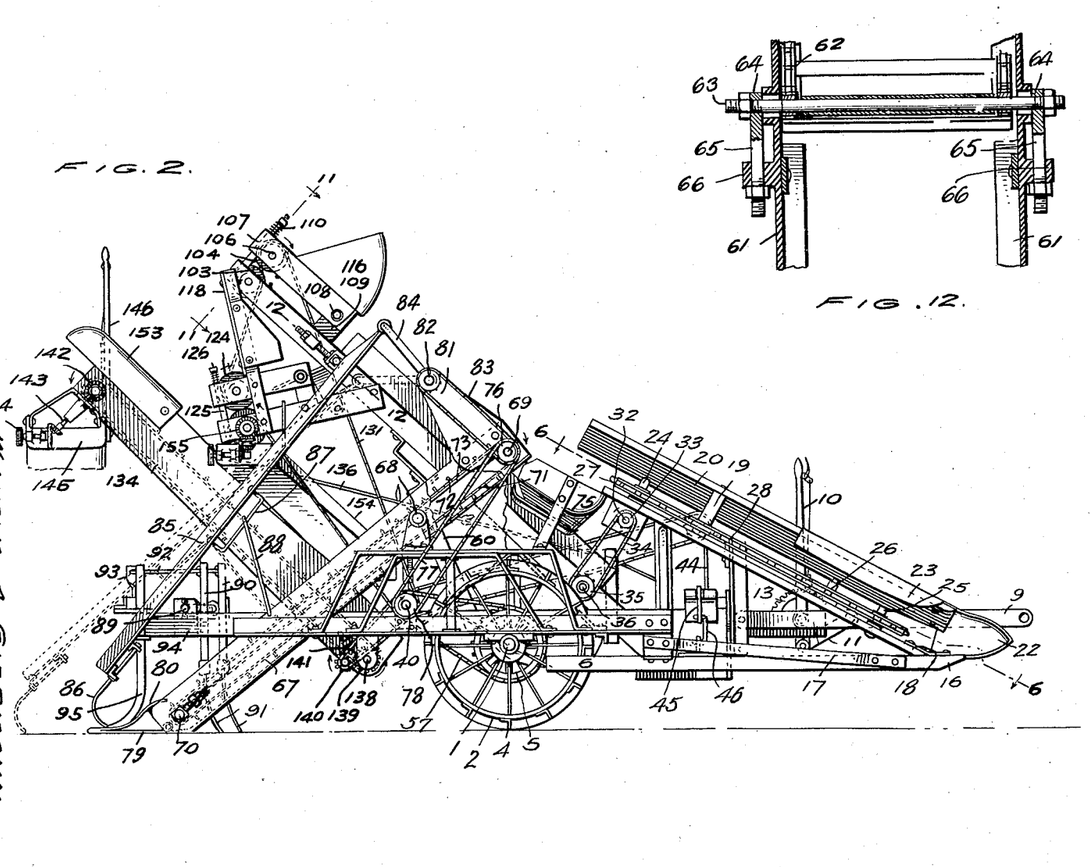
Figure 2 is an elevation of one side thereof.
Figure 12 is an enlarged section on line 12—12, Figure 2.
Figures 4, 13, 14:
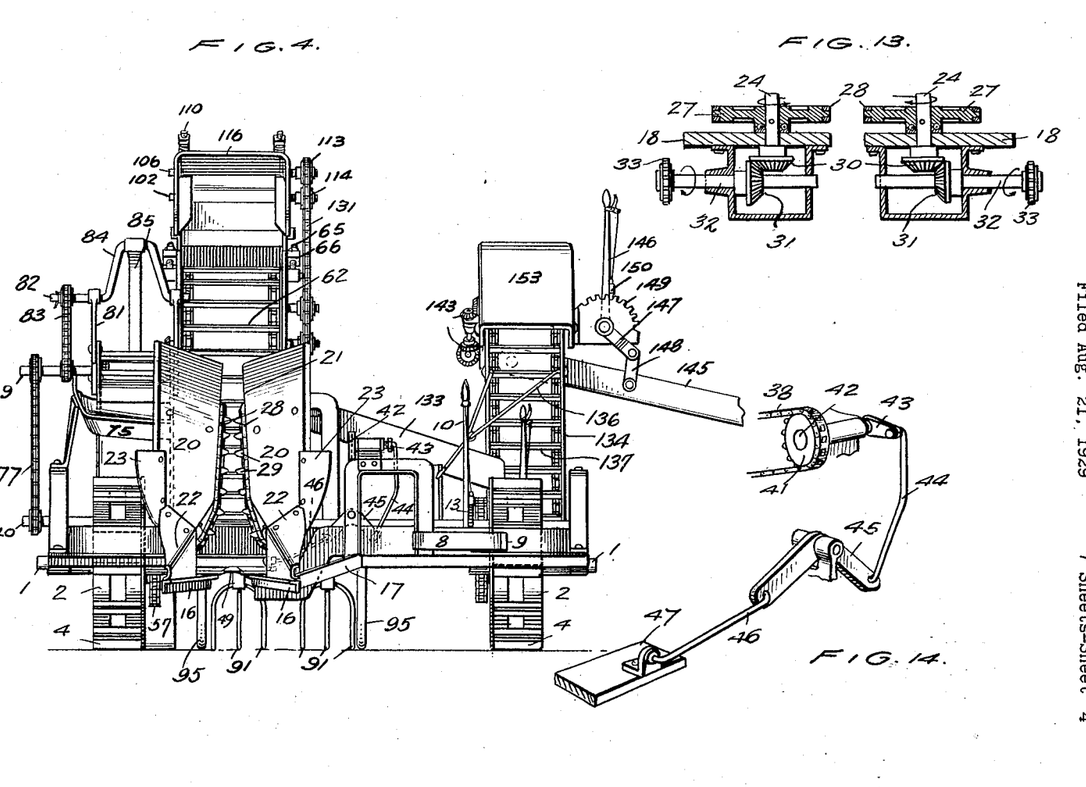
Figure 4 is a front elevation.
Figure 13 is a section on line 13—13, Figure 6.
Figure 14 is a perspective view of a portion of the mechanism used for actuating the cutter bar.

The upper end of the conveyor 137 is mounted on a shaft 142 adapted to be driven by the conveyor. By means of gears and shafts indicated generally at 143 in Figure 2, motion may be transmitted from shaft 142 to a sprocket 144 located at one side of the upper end of an outlet chute 145. This chute is extended under the upper end of the elevator frame 134 and is adapted to receive material delivered from the elevator 137 carried by said frame. The chute 145 can be adjusted angularly relative to the frame 134 by means of a lever 146 which, as shown in Figure 4, has an arm 147 connected to the chute 145 by a link 148. A toothed segment 149 can cooperate with a dog 150 on lever 146 for the purpose of holding the chute 145 at any angle to which it might be adjusted.

If desired an endless conveyor 151 can be mounted in the chute 145, the same being driven by chain and sprocket mechanism 152 receiving motion from the sprocket 144. Obviously any other means can be used for this purpose, if desired.

A hood 153 can be extended over the upper end of the frame 134 for the purpose of deflecting elevated material downwardly into the chute 145 and onto the conveyor 151.

Movement of material along the chute 133 may be expedited by arranging an endless conveyor 154 in said chute, this conveyor being driven by gear and shaft mechanism indicated generally at 155, the said mechanism receiving its motion from the shaft 120 of the lower husking roll 121.

Obviously belt tighteners, adjustable bearings, braces, and similar devices may be placed wherever deemed necessary or desirable in this structure and it has not been deemed necessary to show or describe any of these parts in detail. Furthermore the elevators can be placed at angles differing from those illustrated and the parts placed wherever found most desirable for the purpose of delivering the materials at proper points.

The operation of the machine appears to be clearly apparent from the foregoing description. When the machine moves forwardly the standing stalks will be received between the noses 22 and be maintained in upstanding positions by the rearwardly moving fingers 29 on the chain 28. When the cutting mechanism reaches the stalks, said stalks will be severed between the blades 49 and 50 and the severed stalks will fall rearwardly on to the elevator 62 which will convey them upwardly head first. The upper ends of the stalks will pass between the snapping rolls 104 and 103 and while the stalks are delivered rearwardly from between these rolls, the ears will be severed and delivered downwardly on to the table 132. From this table the ears will be fed to the husking rolls 121 and 124. These rolls can be of any desired construction suitable for removing husks and for moving the husked ears longitudinally of the rolls. The husks will be delivered rearwardly from the rolls while the ears will be delivered from the ends of the rolls onto the conveyor in the chute 133. They will then be carried laterally to the lower portion of the elevator 137. This will carry them upwardly to the delivery chute 145 from which they will be directed into a wagon or other structure provided therefor.

As has already been explained, any material that might fail to enter the machine through the gathering means will be brushed laterally into a row by the fingers 91 so that the oscillating and reciprocating rake tines 86 will gather this material and drag it onto the elevator in frame 67. Thus this material that would otherwise be wasted will be conveyed upwardly and directed onto the elevator 62 so as to be properly fed to the snapping and husking means.

What is claimed is:

1. In a corn harvester the combination with forwardly extending stalk-gathering and severing means, of an elevator for receiving the stalks from said means, and mechanism at the rear of the machine for gathering loose material from the ground over which the machine has passed and directing it to said conveyor.

2. A corn harvester including a gathering means, a conveyor, means for severing gathered stalks and depositing them on the conveyor, means operating at the rear of the machine for gathering loose material passed by the gathering means, and mechanism for conveying the gathered loose material to the conveyor.

3. A corn harvester including gathering and cutting mechanisms, a conveyor for receiving severed stalks from said mechanisms, a rake operating in the rear of the machine, means for actuating the rake to collect material from the ground, and means for conveying the collected material to the conveyor.

4. A corn harvester including gathering and cutting mechanisms, an elevator for receiving material from said mechanisms, a rake mounted for reciprocation in the rear of the machine, means for directing into the path of the rake loose material passed by the gathering mechanism, and means for conveying material from the rake to the elevator.

5. A corn harvester including gathering and cutting mechanisms, an elevator for receiving severed stalks therefrom, a movable rake supported back of the machine, means for actuating the rake, thereby to engage loose material passed by the gathering mechanism and move it forwardly relative to the machine, and means for conducting said material from the rake to the elevator.

6. A corn harvester including gathering and cutting mechanisms, an elevator for receiving severed stalks therefrom, a rake, means for reciprocating the rake, means for elevating the rake during portions of its reciprocating movement, means for directing into the path of the rake loose material passed by the gathering means, and means for conveying material from the rake to the elevator.

7. In a corn harvester the combination with gathering and cutting mechanisms and an elevator for receiving severed stalks therefrom, of a movable rake in the rear of the machine, a pivoted supplemental frame, adjustable means carried thereby for engagement with the surface of the ground to support the supplemental frame, means carried by the supplemental frame for directing into the path of the rake loose material passed by the gathering mechanism, a conveyor for conducting material to the elevator, and means for actuating the rake to direct the loose material onto the conveyor.

8. In a corn harvester the combination with cutting mechanism, and an elevator for receiving harvested material, of a rake movably supported back of the machine, means for directing loose material into the path of the rake, and means for conducting material from the rake to the elevator.

9. In a corn harvester the combination with gathering and cutting mechanisms, and an elevator for receiving material therefrom, of a crank shaft, adjustable means for supporting the shaft at a predetermined distance from the ground, sweeping devices mounted on and actuated by the crank shaft for engaging loose material and directing it laterally along the surface of the ground, and means for engaging said material and conducting it to the elevator.

10. In a corn harvester the combination with gathering and cutting mechanisms, and an elevator for receiving material therefrom, of a crank shaft, adjustable means for supporting the shaft at a predetermined distance from the ground, sweeping devices mounted on and actuated by the crank shaft for engaging loose material and directing it laterally along the surface of the ground, and means for engaging said material and conducting it to the elevator, said means including a rake, means for reciprocating the rake upon the surface of the ground, means for raising and lowering the rake during its reciprocation, and means for conveying material from the rake and delivering it to the elevator.

11. In a harvester the combination with an elevator for conveying material upwardly and rearwardly, of an obliquely disposed shaft supported in rear of and beneath the elevator, said shaft having a crank, a shank pivotally mounted on the crank, means at the lower end of the shank for engaging loose material and directing it laterally relative to the machine, a link for restraining the upper end of the shank, means for rotating the shaft to impart an oscillation and up and down movement to the shank, and means for gathering the shifted loose material and directing it to the elevator.

12. In a harvester the combination with an elevator for conveying material upwardly and rearwardly, of an obliquely disposed shaft supported in rear of and beneath the elevator, said shaft having a crank, a shank pivotally mounted on the crank, means at the lower end of the shank for engaging loose material and directing it laterally relative to the machine, a link for restraining the upper end of the shank, means for rotating the shaft to impart an oscillation and up and down movement to the shank, and means for gathering the shifted loose material and directing it to the elevator, said means including a rake mounted for oscillation, means for raising and lowering the rake during the oscillation thereof, and a conveyor for receiving material from the rake and directing it to the elevator.

In testimony that I claim the foregoing as my own, I have hereto affixed my signature.

WILHELM A. GIERMANN.